US007006117B1

(12) United States Patent
Man et al.

(10) Patent No.: US 7,006,117 B1
(45) Date of Patent: Feb. 28, 2006

(54) APPARATUS FOR TESTING DIGITAL DISPLAY DRIVER AND METHOD THEREOF

(75) Inventors: Albert Tung-chu Man, Richmond Hill (CA); Victor Herbert Flack, Newmarket (CA); Yuri Lee, North York (CA)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/574,327

(22) Filed: May 19, 2000

(51) Int. Cl.
*G09G 5/00* (2006.01)
(52) U.S. Cl. ............... 345/904; 345/622; 714/738
(58) Field of Classification Search ........... 345/904, 345/622; 348/181, 189, 180, 177, 182; 714/738
See application file for complete search history.

(56) References Cited

U.S. PATENT DOCUMENTS

| | | | | | |
|---|---|---|---|---|---|
| 4,772,948 | A | * | 9/1988 | Irvin | 348/177 |
| 4,780,755 | A | * | 10/1988 | Knierim | 348/180 |
| 4,894,718 | A | * | 1/1990 | Hung | 348/181 |
| 5,345,263 | A | * | 9/1994 | Miller | 348/182 |
| 5,414,713 | A | * | 5/1995 | Waschura et al. | 714/715 |
| 5,537,145 | A | * | 7/1996 | Miseli | 348/181 |
| 5,835,134 | A | * | 11/1998 | Thacker | 348/180 |
| 5,861,882 | A | * | 1/1999 | Sprenger et al. | 345/326 |
| 5,884,044 | A | * | 3/1999 | Marsanne et al. | 709/232 |
| 5,920,340 | A | * | 7/1999 | Man et al. | 348/181 |
| 5,943,092 | A | * | 8/1999 | Chuang et al. | 348/177 |
| 6,219,039 | B1 | * | 4/2001 | Chang et al. | 345/204 |
| 6,323,828 | B1 | * | 11/2001 | Perez | 345/10 |
| 6,373,476 | B1 | * | 4/2002 | Dalgleish et al. | 345/204 |
| 6,505,266 | B1 | * | 1/2003 | Gu | 710/305 |

FOREIGN PATENT DOCUMENTS

DE      29721762 U1 * 12/1997

OTHER PUBLICATIONS

Digital Visual Interface (DVI) by Digital Display Working Group (DDWG), Apr. 2, 1999.*
Automated Video Test Card with Self-Test Mechanisms by IBM Technical Disclosure Bulletin, Oct. 1989, US.*
Bruce Neglry, Using the 24LC21 Dual Mode Serial EEPROM; 1995, Microchip Technology Inc.*
Neil Sclater and John Markus: McGraw-Hill Electronics Dictionary, sith Edition.*
Video Digital Flat Panel Standard, pp. 1-16, Feb. 14, 1999.

* cited by examiner

*Primary Examiner*—Guy Lamarre
*Assistant Examiner*—Fritz Alphonse
(74) *Attorney, Agent, or Firm*—Vedder, Price, Kaufman & Kammholz, P.C.

(57) ABSTRACT

In a specific embodiment of the present invention, a graphics device generates digital output data in response to a known input data. The resulting digital output data has an expected circular redundancy check (CRC) value. The generated digital output data is provided to a digital graphics output port associated with the graphics controller, which is thereby transmitted to a test apparatus over a digital graphics cable. The test apparatus performs an analysis on the received digital graphics data. The analysis results are transmitted back to the graphics device over a serial link of the digital display cable. The graphics device receives the transmitted analysis data, which is subsequently used to determine if the graphics device is operating properly. This determination may be made the graphics device, or by a host system for further analysis.

18 Claims, 5 Drawing Sheets

APPARATUS FOR TESTING DIGITAL DISPLAY DRIVER AND METHOD THEREOF

FIELD OF THE INVENTION

The present invention relates generally to testing digital graphics devices, and more specifically to an apparatus and method for verifying the integrity of digital graphics data.

BACKGROUND OF THE INVENTION

The use of digital graphics data, or video data, to provide images to display devices is becoming increasingly common with multimedia systems. As display device size, resolution, and color depth increase, however, the complexity of the display devices that render images, and the amount of time needed to test such devices also increases.

Traditional graphics/video output test is to connect panel or monitor and user has to display pattern and looks for ringing, smearing and artifact. An advanced and expansive approach is used instrumentation to capture signal and compare with output results. Such tests are relatively slow, and require significant hardware to capture and compare results.

DETAILED DESCRIPTION OF DRAWINGS

In a specific embodiment of the present invention, a graphics device generates digital output data in response to a known input data. The resulting digital output data has an expected circular redundancy check (CRC) value. The generated digital output data is provided to a digital graphics output port associated with the graphics controller, which is thereby transmitted to a test apparatus over a digital graphics cable.

The test apparatus performs an analysis on the received digital graphics data. Subsequent to performing this analysis, the results are transmitted back to the graphics device over a serial link of the digital display cable. In a specific embodiment, the transmission of analysis data between the test apparatus and the graphics device occurs over a non-video serial data node of the display connector that functions as a serial control interface.

The graphics device receives the transmitted analysis data, which is subsequently used to determine if the graphics device is operating properly. This determination may be made the graphics device, or by a host system for further analysis. Specific embodiments of the present invention are described herein with reference to FIGS. 1–5.

Figure 1:
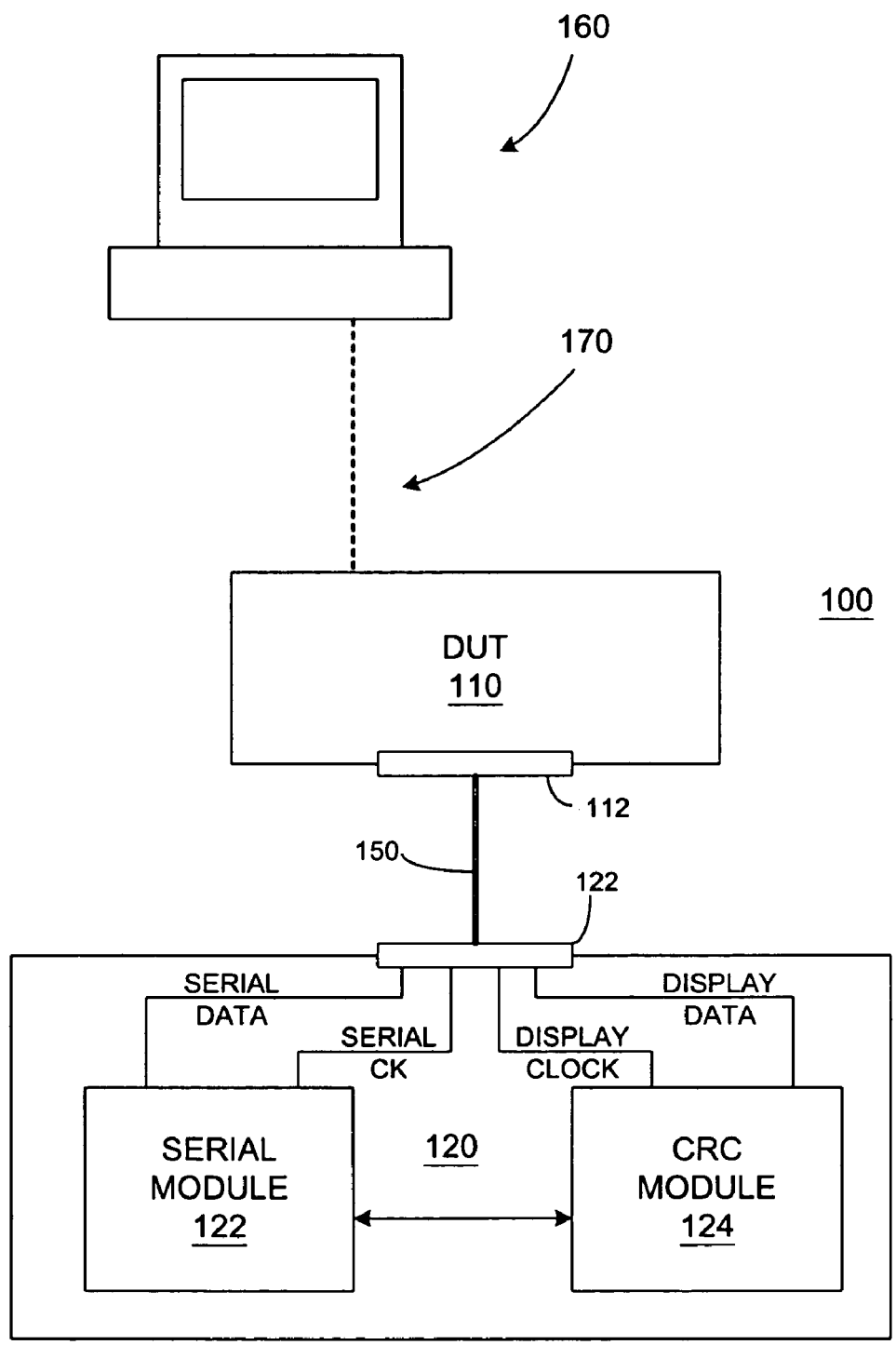
FIG. 1 illustrates, in block diagram form, an apparatus for testing a digital display driver.

FIG. 1 illustrates a system 100 which includes a computing device 160, a graphics device (device under test—DUT) 110, and a test apparatus 120.

The computing device 160 is typically a general-purpose computer, although other standard or custom computing devices can be used. The computing device 160 is connected to the graphics device 110 through the interface 170. In a specific implementation, the interface 170 is a peripheral components interconnect (PCI) bus, or an accelerated graphics port (AGP) bus. Other standard and/or custom busses can be used as well.

The graphics device 110 is a device under test, such as a graphics controller mounted on printed circuit board. It will be appreciated by one of ordinary skill in the art that the term graphics device is being used generically herein and applies to devices capable of generating digital video data. Specifically, the graphics device 110 provides digital data for display to an output port.

The term port refers to a set of one or more nodes having a common or associated function. Generally, the term node refers to conductive interconnect, often where a connection to another device is made, or to be made. For example, the connector 112 represents a graphics port because its individual pins have an associated function—to support the transmission of digital graphics data per a specific protocol, and it provides a connection to an external cable. In other embodiments, a port can include device pads, pins, and/or traces. In a specific embodiment, the pins of connector 112 are specified by Video Electronics Standards Association (VESA) DFP standard, which is generally used to connect to a flat panel display device (not shown).

A cable 150 connects the digital graphics connector 112 to a digital graphics connector 122 of the test apparatus 120. Test apparatus 120 includes a serial module 122 and a CRC module 124. The operation of system of FIG. 1 is further described with reference to the method of FIG. 2. Note that in an alternate embodiment, the connector 122 can be select to mate directly to the connector 112, thereby eliminating the need for a cable 150.

Figure 2:
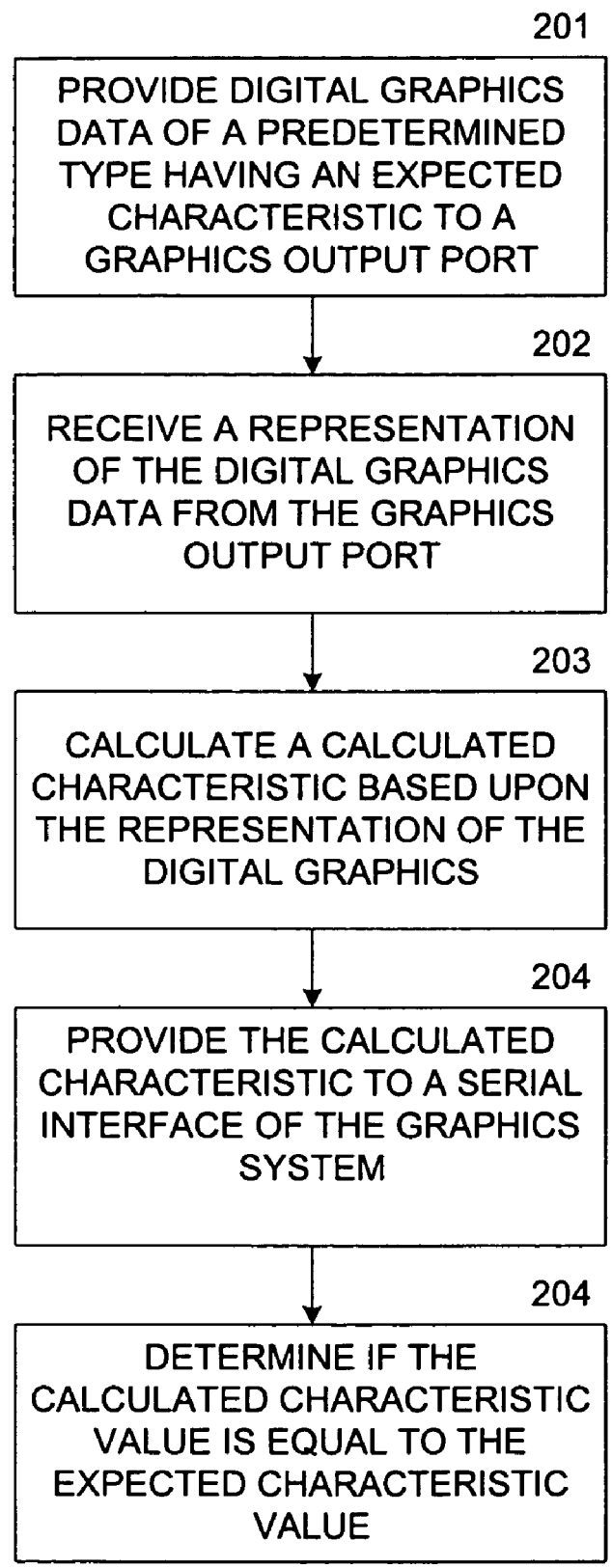
FIG. 2 illustrates, in flow diagram form, a method for testing a digital display driver.

At step 201 of FIG. 2, digital graphics data is provided to a digital video port of the graphics device 110. Generally, this digital graphics data is generated by a graphics controller (not shown) associated with graphics device 110 in response to commands and/or data from the computing device 160. The types and/or components of digital data generated by the graphics device 110 include color components (Red, Green, Blue—RGB), and control or synchronization components (HSYNCH, and VSYNCH). Furthermore, the digital data provided to the digital video port has an expected characteristic, such as an expected CRC value.

At step 202, a representation of the digital graphics data is received at a video port of the test apparatus 120. In one embodiment, the representation of the digital graphics data includes differential signals.

At step 203, the CRC module 124, which is a test module, calculates a calculated characteristic, such as a CRC value, based on the received digital graphics data. In one implementation, the CRC value is calculated from received RGB color component values. In another embodiment, the CRC value is calculated from received RGB color component values and HSYNCH and/or VSYNCH transitions. In another implementation, the generated value is a count indicating the number of received HSYNCH and or VSYNCH transitions.

At step 204, the calculated characteristic value(s) is provided back to the graphics device using the serial data interface nodes of the digital graphics port 122.

At step 205, the calculated characteristic value is compared to the expected characteristic value to determine if the transmission was successful. The comparison of step 205 can be performed by the graphics device 110, or by the computing device 160. In order for the computing device 160 to compare the calculated characteristic value with the expected characteristic value, the calculated characteristic value needs to be transferred from the graphics device 110 to the computing device 160. By storing such information on the computing system 160, a log of each test can be maintained.

The implementation of the present invention described above can perform the CRC calculation while receiving the digital graphics data at full speed. For example, by using an integrated circuit device, the CRC can be calculated at video data clock rates. For example, a clock rate of 165 Mhz capable of supporting UXGA can be supported by using appropriate speed grade components. In addition, by transmitting CRC results back to the host 160, through the graphics device 110, the amount of overhead associated with the test device 120 is reduced to the analysis logic and the logic needed to be a serial slave, and the need for visual scanning is eliminated.

In a specific implementation, the test device 120 can be mounted on an add-in board for the purpose of being housed in the computing device 160. The test device 120 can obtain power from any external source, including a power node of a bus, or from a digital graphics node that provides power. Because an existing serial connection of the bus 150 is used to communicate the values calculated on the test device 120, expensive connections are avoided (i.e. PCI bus protocol support, or parallel port support is not needed).

Figure 3:
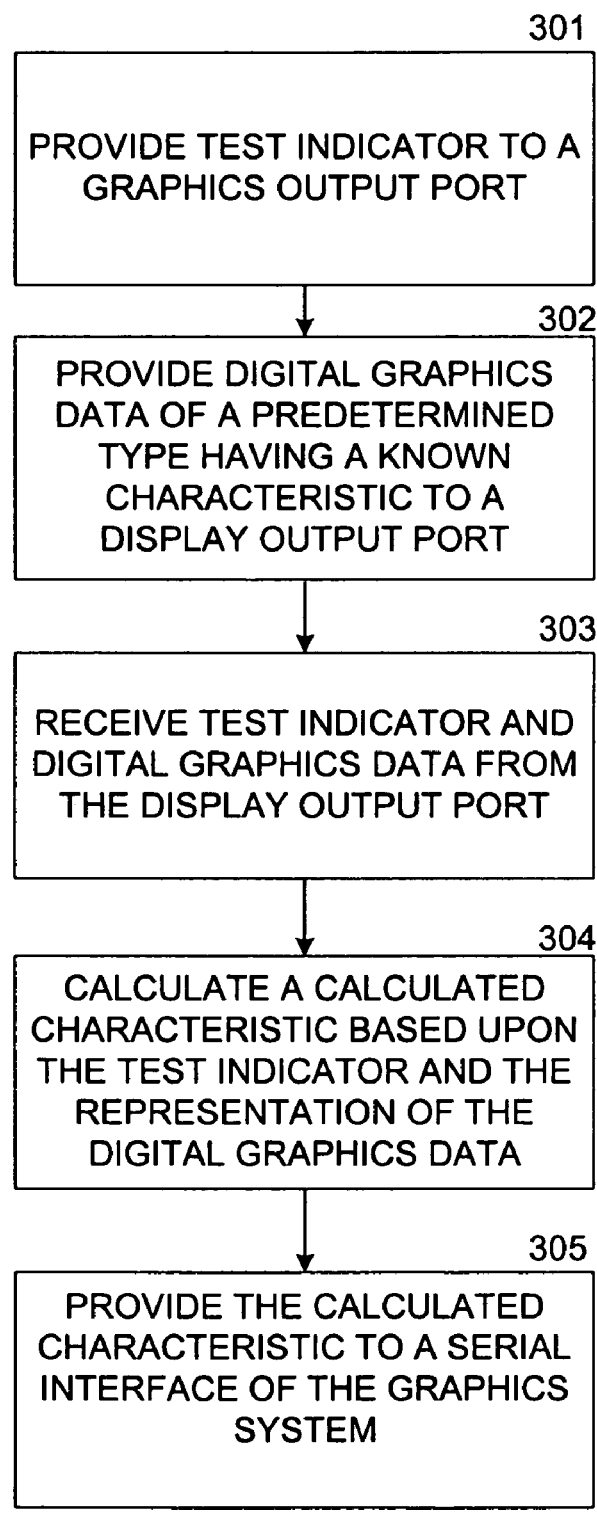
FIG. 3 illustrates, in flow diagram form, an alternative method for testing a digital display driver.

FIG. 3 illustrates an alternate method in accordance with the present invention. At step 301, a test indicator is provided to the graphics device 120 output port. The test indicator can be provided to the test module 120 over the serial data interface portion of the graphics port 112.

The test indicator is used to indicate the graphics data to be tested and/or the calculated characteristic to be calculated. For example, an 8-bit value, when provided to the test device 120, can indicate that the CRC module 124 is to calculate the CRC based on a specific color component (type) only. For example, referring to FIG. 4, a value can be written to the serial-in register 426 that only enables one switch of the switches 430. For example, the switch associated with accumulator 417 can be enabled. As a result, the CRC value is based only on the red color component from demultiplexor 420. Alternatively, if the value written to the serial in register 426 enables the switches associated with accumulators 415–417, a CRC value will be generated based on the red, blue and green color components.

In yet another embodiment, a value can be provided to register 426 that enables a switch associated with accumulator 418 or 419, the resulting value will represent the number of VSYNCH, or HSYNCH transitions respectively. Furthermore, a control value can be selected to include HSYNCH and/or YSYNCH transitions in the CRC count with color component data. The value to be calculated by the CRC Module 124 is selected to calculate the calculated characteristic in the same manner that the expected characteristic was calculated.

By allowing the flexibility described, errors can be pinpointed with greater accuracy. For example, where a full color component CRC value fails, the system can request individual color components be tested.

Steps 302–306 are analogous to step 201–205 of FIG. 2, and are not repeated herein.

Figure 4:
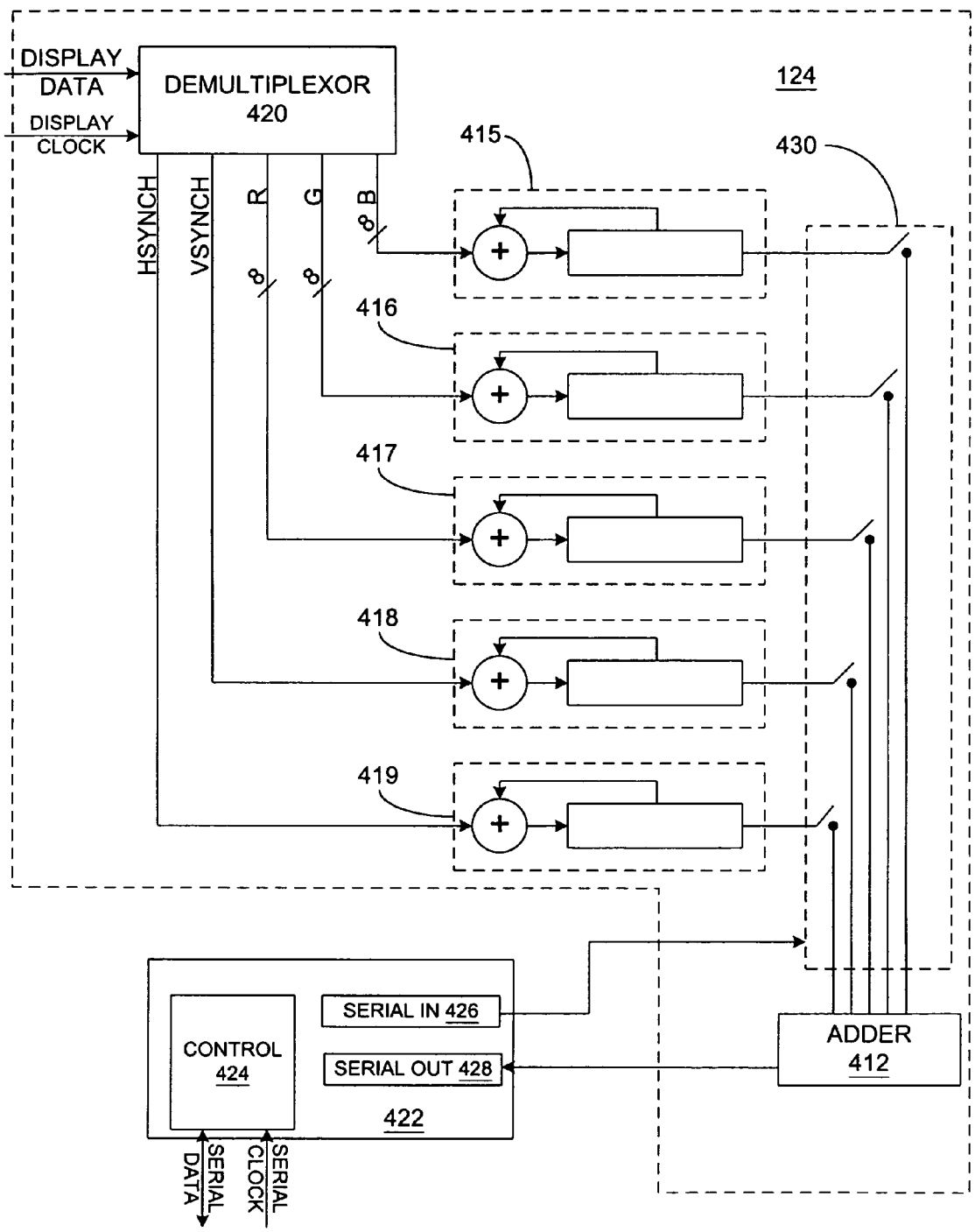
FIG. 4 illustrates, in block diagram form, a more detailed illustration of the apparatus of FIG. 1.

FIG. 4, illustrates a more detailed embodiment of the CRC module 124, and the Serial module 122. The CRC module 124 demultiplexes the color component data and synchronization data from the received display data and clock signals.

In the embodiment illustrated, each of the color and synchronization component values are received by separate accumulators 415–419, which maintain running totals. The accumulators 415–419 can be reset and/or latched by control circuitry (not illustrated) which is capable of being implemented by one of ordinary skill in the art.

A switch bank 430 is controlled by a data value received at the serial module 122. When an accumulator's switch is closed, the accumulated value stored in its register is summed by adder 412 to any other selected accumulator values to generate the generated CRC value. Note that other specific computations can be made to the CRC value as needed. The calculated CRC value from the adder is sent to the serial module 122 for transmission.

One of ordinary skill in the art will recognize that the block diagram of FIG. 4 illustrates a specific implementation that can also be considered a functional representation, and that many variations of the portions illustrated in FIG. 4 can be implemented. For example, control portions capable of resetting, latching, and otherwise controlling the accumulators of FIG. 4, based on data received over the serial data port are anticipated herein.

Figure 5:
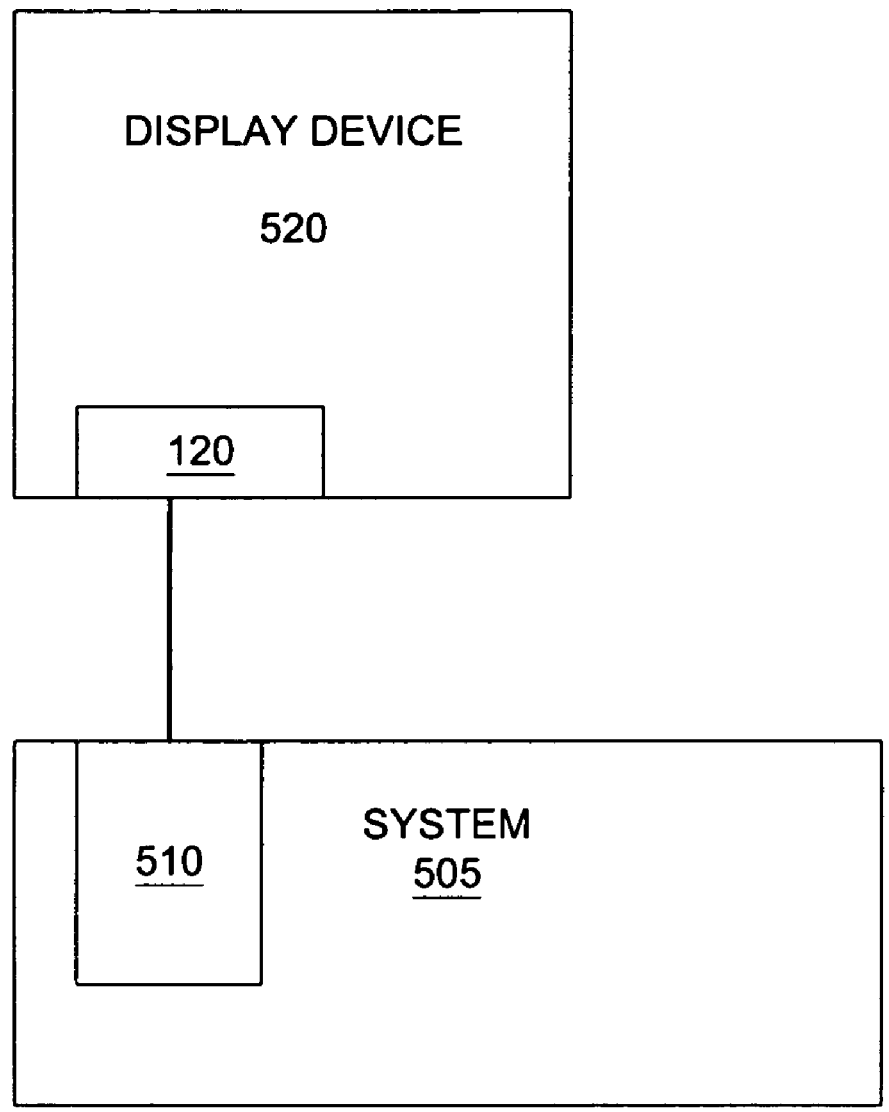
FIG. 5 illustrates, in block diagram form, the apparatus of FIG. 1 implemented in a system.

FIG. 5 illustrates a system, such as a general purpose computer system, that includes a display device 520 having a test module 120 built in. In this implementation, a processing portion of the system can request the display device 520, which will generally be a flat panel monitor, to calculate a CRC to check the integrity of the graphics card. This request is transmitted through the graphics device 510. The calculated CRC value will be returned to the processing portion of the system through the graphics device 510. This allows for increased diagnostic capabilities that can be performed by an end user, or at an end users location.

It should now be apparent that a method and system for testing video data as described herein provides advantages over previous methods and systems. For example, at speed testing is accommodated through by using a small amount of test logic. In addition, no additional communication interfaces are needed by using existing serial interfaces.

We claim:

1. A method of testing digital graphics data, the method comprising the steps of:
   providing digital graphics data having an expected characteristic value, to a digital graphics port of a graphics controller under test and which is coupled to a computer via a bus;
   receiving, at a test apparatus, the digital graphics data from the digital graphics port of the graphics controller under test;
   calculating at the test apparatus, a characteristic value that is based upon the digital graphics data; and
   sending the calculated characteristic from a serial data port of the test apparatus to a serial data interface of the digital graphics port of the graphics controller.

2. The method of claim 1, wherein the expected characteristic is a calculated value based upon the predetermined type of digital graphics data.

3. The method of claim 2, wherein the predetermined type of digital graphics data includes at least one of a red, green, and blue color component.

4. The method of claim 2, wherein the expected characteristic is a circular redundancy check (CRC) value.

5. The method of claim 1, wherein the predetermined type of digital graphics data is selectable.

6. The method of claim 1, wherein
the step of providing the calculated characteristic from the test apparatus to a serial interface includes providing the calculated characteristic to the computer; and
the step of comparing the calculated characteristic to the expected characteristic by the graphics controller is replaced by the step of:
comparing the calculated characteristic to the expected characteristic by at least one of: the computer and the graphics controller.

7. The method of claim 1, wherein
the step of receiving, at a test apparatus includes the step of: receiving at a test apparatus, the graphics data at a rate greater than 100 MHz; and
the steps of calculating at the test apparatus, and the step of providing the calculated characteristic, are performed in real time with respect to the step of receiving at a test apparatus.

8. The method of claim 1, wherein the graphics output port includes an output port for a flat panel display.

9. The method of claim 1, wherein the serial interface is associated with the graphics output port.

10. A method of testing digital graphics data, the method comprising the steps of:
receiving digital graphics data at a graphics port of graphics test apparatus, said graphics port having a serial data interface;
determining a characteristic value upon the reception of the digital graphics data at said graphics test apparatus; and
transferring the characteristic value from the graphics test apparatus to a graphics controller over the serial data interface of the graphics port of the graphics test apparatus.

11. The method of claim 10, wherein the step of providing includes the graphics port being part of a digital graphics interconnect port.

12. The method of claim 11, wherein the digital graphics interconnect is based on a Digital Flat Panel interconnect standard interconnect.

13. The method of claim 10, wherein the steps of determining and providing occur in real-time with respect to the step of receiving.

14. The method of claim 13, wherein the step of receiving includes receiving graphics data at a clock rate of at least 100 MHz.

15. An apparatus for testing digital graphics data, the system comprising:
a connector to receive the digital graphics data sent from a graphics controller;
a graphics data analyzer module having an input coupled to the connector, and an output, said graphics data analyzer being capable of calculating a value from digital graphics data it receives through the connector; and
a serial bus interface control module having an input coupled to the output of the graphics data analyzer module, and a serial data port coupled to the connector, said serial bus interface control module being capable of sending serial data from said serial data port.

16. The system of claim 15, wherein the serial data port is coupled to the connector to transmit serial data based upon the digital graphics protocol.

17. The system of claim 16, wherein the digital graphics protocol is a Digital Flat Panel standard.

18. The system of claim 15, further comprising a power supply terminal to receive power from a peripheral component interface (PCI) bus.

* * * * *